US008245330B2

(12) United States Patent
Atkinson

(10) Patent No.: US 8,245,330 B2
(45) Date of Patent: Aug. 21, 2012

(54) PORTABLE HANDSINK AND METHOD FOR USE

(76) Inventor: Danny T. Atkinson, Cary, NC (US)

( * ) Notice: Subject to any disclaimer, the term of this patent is extended or adjusted under 35 U.S.C. 154(b) by 1514 days.

(21) Appl. No.: 11/730,324

(22) Filed: Mar. 30, 2007

(65) Prior Publication Data
US 2007/0261162 A1 Nov. 15, 2007

Related U.S. Application Data

(60) Provisional application No. 60/787,545, filed on Mar. 31, 2006.

(51) Int. Cl.
A47K 1/00 (2006.01)
(52) U.S. Cl. .......................................................... 4/625
(58) Field of Classification Search .............. 4/625–627, 4/602–603, 654–655, 657, 559, 572.1, 580–583, 4/452
See application file for complete search history.

(56) References Cited

U.S. PATENT DOCUMENTS

| 4,765,003 | A |  | 8/1988 | Chang |  |
|---|---|---|---|---|---|
| 4,769,863 | A |  | 9/1988 | Tegg et al. |  |
| 5,465,438 | A |  | 11/1995 | Allman et al. |  |
| 5,502,848 | A |  | 4/1996 | Cowan |  |
| 5,687,434 | A |  | 11/1997 | Tagg |  |
| D553,753 | S |  | 10/2007 | Mullett et al. |  |
| 7,469,430 | B2 | * | 12/2008 | Thies | 4/516 |
| 7,743,439 | B2 |  | 6/2010 | Switzer |  |
| 2005/0199267 | A1 | * | 9/2005 | Oakes | 134/10 |
| 2008/0184720 | A1 | * | 8/2008 | Morgan et al. | 62/150 |
| 2010/0051639 | A1 |  | 3/2010 | Stob et al. |  |

OTHER PUBLICATIONS

KegWorks, *Hand Sink Cart Product Description*, Found at: http://www.kegworks.com/hand-sink-cart-561-p172664?source=nextopia and http://www.buy.com/prod/hand-sink-cart-granite-green-base-w-black-topdoors/ q/sellerid/20192858/loc/66357/212996447.html, Accessed Aug. 18, 2011.
Lakeside, *Lakeside Mobile Hand Washing Station* (9600) *Product Description*, Found at: http://www.foodservicewarehouse.com/lakeside/9600/p382112.aspx, Accessed Aug. 18, 2011.
PolyJohn, *Mobile Hand Washing Station Product Description*, Found at: http://www.drillspot.com/products/564655/polyjohn_grng-psw1-1000_mobile_hand_wash_station?s=1 and http://www.polyjohn.com/products.html?cat=sinks&prod_id=PSW1-1000, Accessed Aug. 18, 2011.

* cited by examiner

*Primary Examiner* — Lori Baker
(74) *Attorney, Agent, or Firm* — Buchanan Ingersoll & Rooney PC

(57) ABSTRACT

Exemplary apparatuses and methods for providing clean hot and/or cold water on demand from a portable structure include water storage tanks that store the clean water, and a sink assembly for dispensing the clean water to a user. A pumping system pumps water from the water storage tanks to the sink assembly, and a filtration system that filters water flowing from the sink assembly to the water storage tanks.

16 Claims, 15 Drawing Sheets

PORTABLE HANDSINK AND METHOD FOR USE

CROSS-REFERENCE TO RELATED APPLICATIONS

This application claims a priority benefit under 35 U.S.C. §120 of U.S. Provisional Application No. 60/787,545 filed on Mar. 31, 2006, the entire contents of which have been incorporated in its entirety by reference.

BACKGROUND

1. Field

A portable handsink and a method for using the portable handsink are disclosed.

2. Background Information

People are always "on the go" and spend much of their time in vehicles, at the workplace, or on outings where immediate access to water is needed but unavailable.

One's person can become dirty from a variety of sources or for various reasons, such as food and drink spills, handling money, servicing a vehicle, fueling a vehicle, shaking hands, handling doorknobs in public facilities, changing a baby's diaper, and caring for the sick. Many of these situations often occur in and around a car, or in an area where access to clean water for hand washing or cleaning is unavailable, inconvenient, and/or difficult to obtain. Furthermore, one's activities, whether business or personal related, may require careful attention, thus prohibiting him from leaving the area.

SUMMARY

An exemplary handsink that dispenses temperature controlled water is disclosed. The handsink comprises means for storing water and means for dispensing water. The handsink also comprises means for circulating water between the storing means and dispensing means, and means for sensing a level of stored water. In the exemplary embodiment the handsink comprises means for controlling the direction of water circulation based on the sensed water level.

Exemplary embodiments are directed to a method for controlling a direction of water flow in a portable handsink, where the handsink includes water storage tanks, a pumping system, a plumbing system, and a sink assembly. The method comprises activating the pumping system to pump water out of the water storage tanks to the sink assembly and monitoring a water level in the water storage tanks. The method also comprises controlling a flow of water from the sink assembly to the water storage tanks by adjusting a position of a plurality of valves in the plumbing system.

Exemplary embodiments are also directed to a portable handsink comprising water storage tanks, a sink assembly, and a pumping system that pumps water from the water storage tanks to the sink assembly. The portable handsink also comprises a filtration system that filters water flowing from the sink assembly to the water storage tanks.

DESCRIPTION OF THE DRAWINGS

In the following, an exemplary embodiment will be described in greater detail in reference to the drawings, wherein.

DETAILED DESCRIPTION

Figure 1:
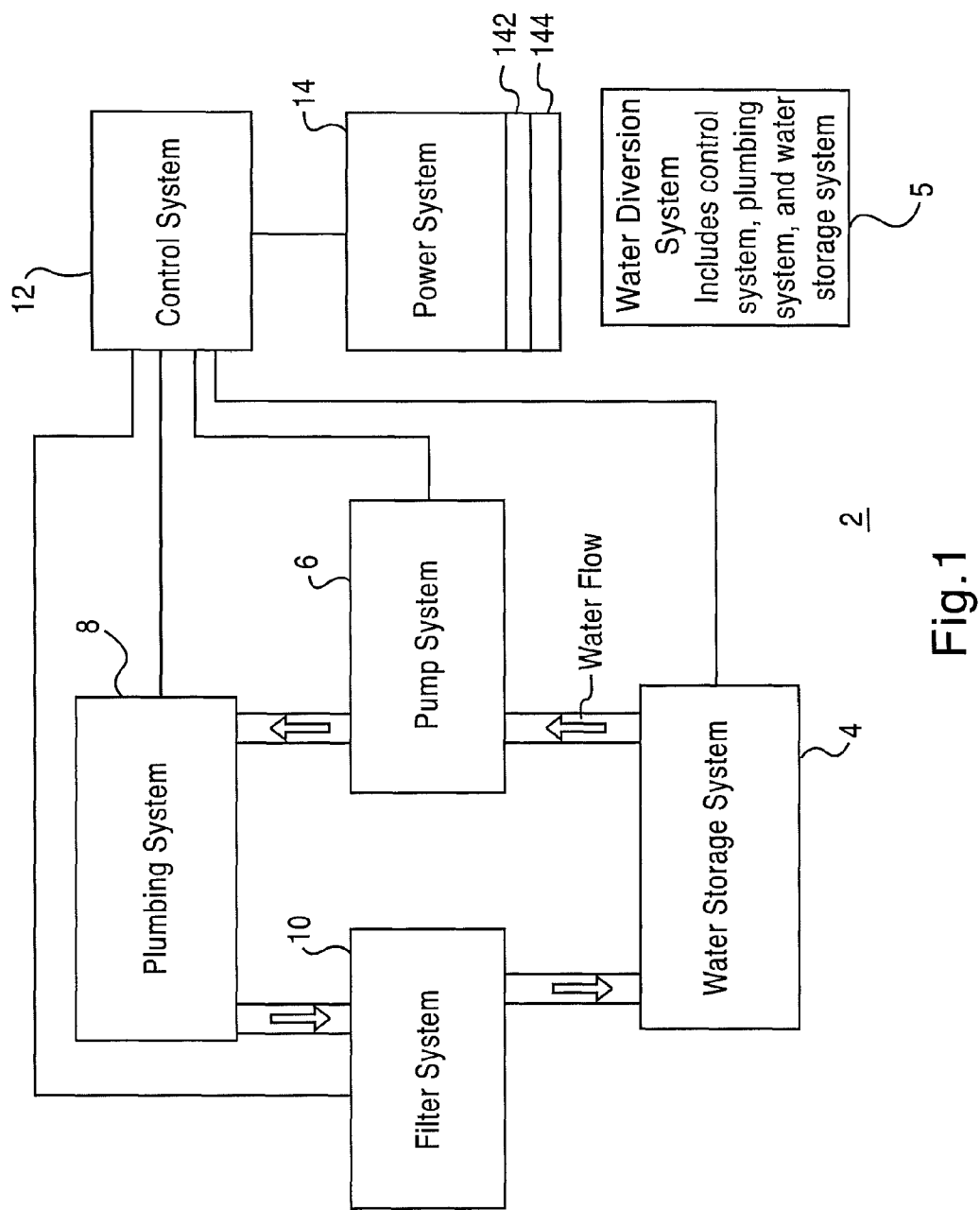
FIG. 1 illustrates an overview of a portable handsink system in accordance with an exemplary embodiment.

FIG. 1 is a block diagram of an exemplary embodiment directed to a handsink for providing clean, hot and/or cold water on demand from a portable structure. The handsink 2 includes means, such as a water storage system 4, for storing water to be used for washing, and means, such as a pumping system 6, for pumping water from the water storage system 4. The handsink 2 also includes means, such as a plumbing system 8, for routing water to/from the water storage system 4, and means, such as a filtration system 10, for filtering water that is returning to the water storage system 4. The handsink 2 includes means, such as a control system 12, for controlling the direction of water flow through the plumbing system 8, and for monitoring the status of various systems of the handsink 2. The handsink 2 also includes means, such as a power system 14, for supplying power to the various systems of the handsink 2.

Figure 2:
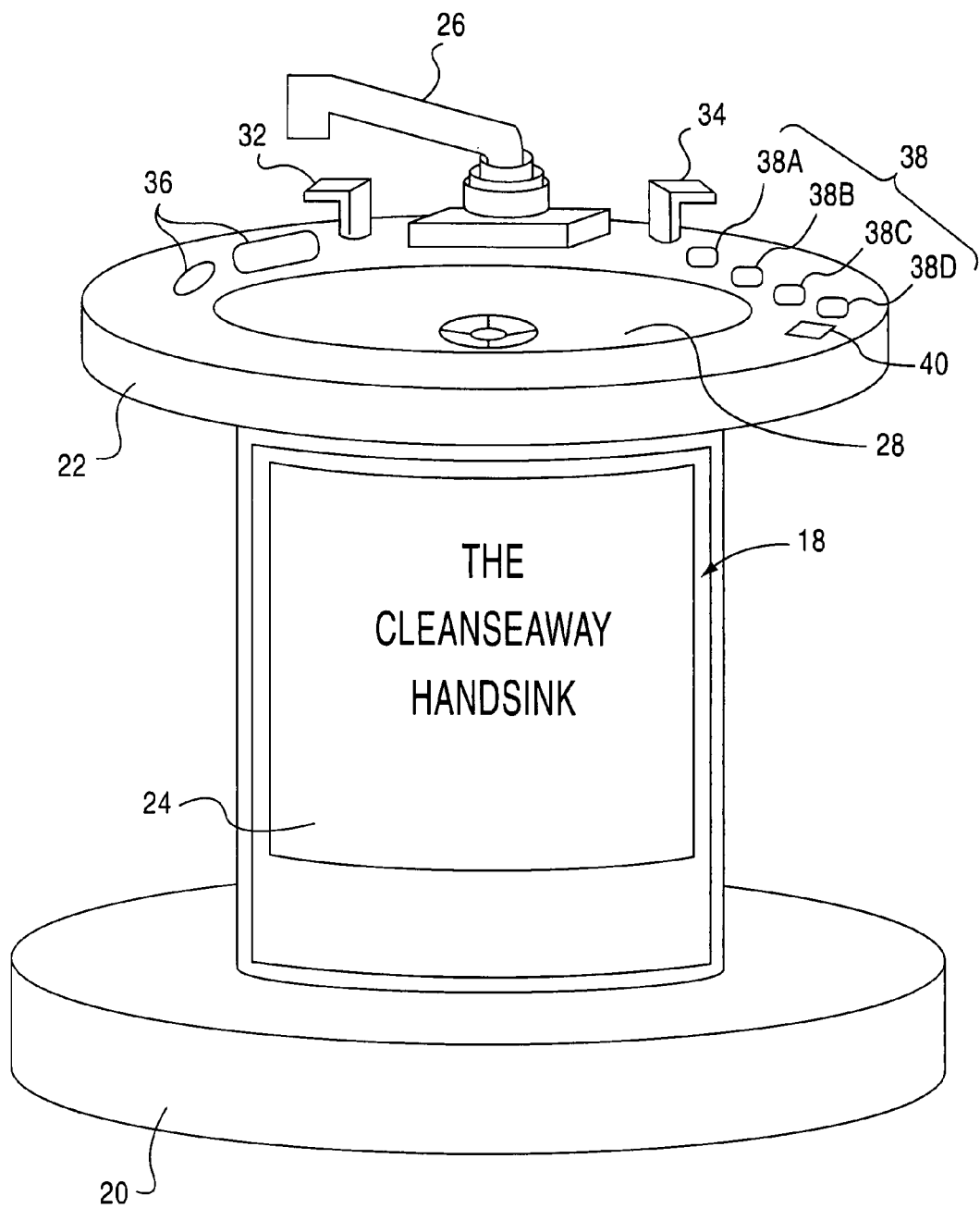
FIG. 2 illustrates a housing assembly in accordance with an exemplary embodiment.

The handsink 2 includes means, such as a housing assembly 16, for housing the various systems. FIG. 2 is a perspective view of an exemplary housing assembly 16. As shown in FIG. 2, the housing assembly 16 includes an enclosure 18, a base 20, and a sink assembly 22. The enclosure 18 can be of any of a number of various polygonal shapes, such as cylindrical, square, or any other shape as desired. One of ordinary skill will appreciate that the enclosure 18 can be of a sufficient diameter or internal area, such as 16 inches or any other size as desired, to completely surround and enclose the internal circuitry of the handsink 2. The enclosure 18 can be formed of acrylonitrile butadiene styrene (ABS), or other suitable high strength and durable material as desired. The enclosure 18 includes an enclosure cover 24 that is removably attached to the enclosure 18. When removed, the enclosure cover 24 exposes and provides access to the internal circuitry of the handsink 2.

The base 20 is securely attached to a bottom-end of the enclosure 18. The shape and size of the base 20 is contingent on the shape, diameter, and/or width of the enclosure 18. One of ordinary skill will appreciate that the base 20 can be of a suitable surface area, such as 450 square inches or any other size as desired to prevent the handsink 2 from tipping over. The base 20 will be discussed in greater detail below.

The sink assembly 22 is securely attached to a top portion of the enclosure 18. The sink assembly includes means, such as a faucet 26, for outputting water pumped from the water storage system 4 through the plumbing system 8. The faucet 26 can be telescopic and retractable, which enables the faucet 26 to be positioned (e.g., extended) as desired. In a fully retracted position, the faucet 26 has a length of approximately 5 inches or other suitable length as desired. Fully extended, the faucet 26 can have a length of 8 inches, or other suitable length as desired. One of ordinary skill will readily appreciate that the faucet 26 can be adjusted to any length within the range of the fully retracted and full extended positions. The faucet 26 can be rotated at an angle of 180° about its base. One of ordinary skill will readily appreciate that the housing assembly 16 can be of various heights and widths as desired. For example, the height and width of the housing assembly 16 can be sufficient to enclose the internal components of the handsink 2, and suitable for storage and/or use by persons of various ages and sizes as desired.

The sink assembly 22 also includes means, such as a receptacle 28, for receiving water that is output from the faucet 26. The receptacle 28 can be formed of ABS or other high-strength durable material as desired. The receptacle 28 can be of a concave shape and have a drain 30 located at its deepest-most point. One of ordinary skill will readily appreciate that the receptacle 28 can have a depth such as 6 inches, or other suitable depth so that water output from the faucet 26 can be channeled to the drain 30. The drain 30 is connected to the plumbing system 8 so that water can be returned to the water storage system 4.

The sink assembly 22 also includes means, such as a hot water valve 32 and cold water valve 34, for separately activating the pumping system 8 to pump water from the water storage system 4, through the plumbing system 8, and out through the faucet 26. The water valves 32 and 34 can be made of ABS or other high-strength durable material as desired. The water valves 32 and 34 can also be color coded, such as red and blue color designations, respectively, for indicating the water temperature. The water valves 32 and 34 can also have any of various alpha-numerical characters or Braille for further water temperature indication.

The sink assembly 22 can include means, such as a soap dish and/or bottle holder 36, for solid and/or liquid soap storage as desired, and means such as light-emitting diode (LED) indicators 38A-38D and a digital or liquid crystal display (LCD) display 40, for providing a visual output of various generating conditions. For example, the LED indicators can include a power indicator 38A, a water change indicator 38B, a filter change indicator 38C, and a failure indicator 38D, or any other system indication as desired. The digital or LCD display 40 can be flush mounted with a top surface of the sink assembly 22, and can have a transparent, shatter-proof cover. The display 40 is connected to the control system 12, and can display any of a number of operational or status codes that indicate the operational status of the handsink 2 and/or any of its various systems and components. One of ordinary skill in the art will appreciate that each of the water valves 32 and 34, LEDs 38A-38D, and display 40 can be mounted over openings in a top surface of the sink assembly 22 so that suitable connection to the plumbing system 8 or control system 12 can be achieved where applicable.

Figure 3:
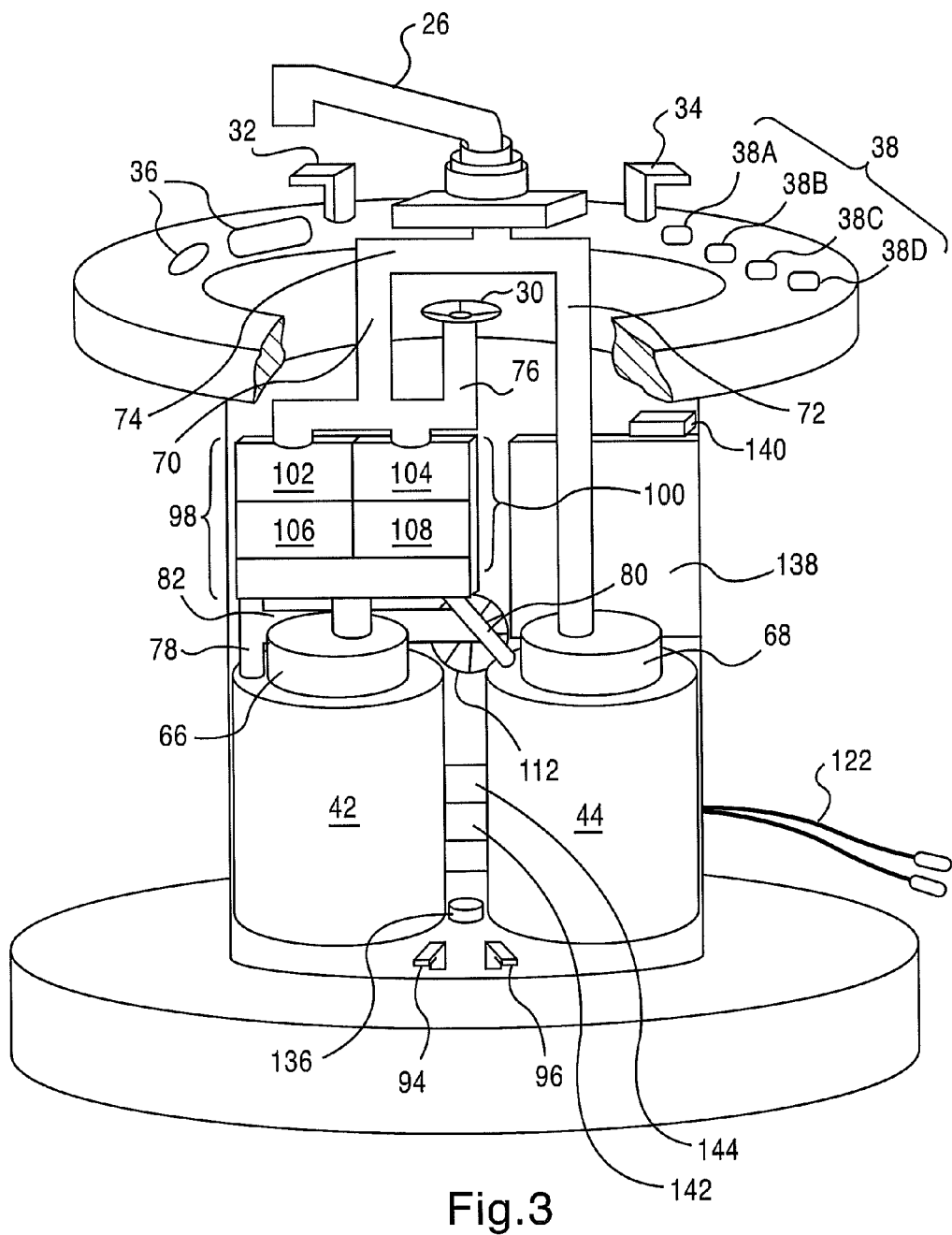
FIG. 3 illustrates internal components of the portable handsink in accordance with an exemplary embodiment.

FIG. 3 illustrates an exemplary embodiment of the internal components and circuitry of the handsink 2. As shown in FIG. 3, the water storage system 4 includes a hot water storage tank 42 and a cold water storage tank 44, for storing hot and cold water, respectively.

Figure 4A:
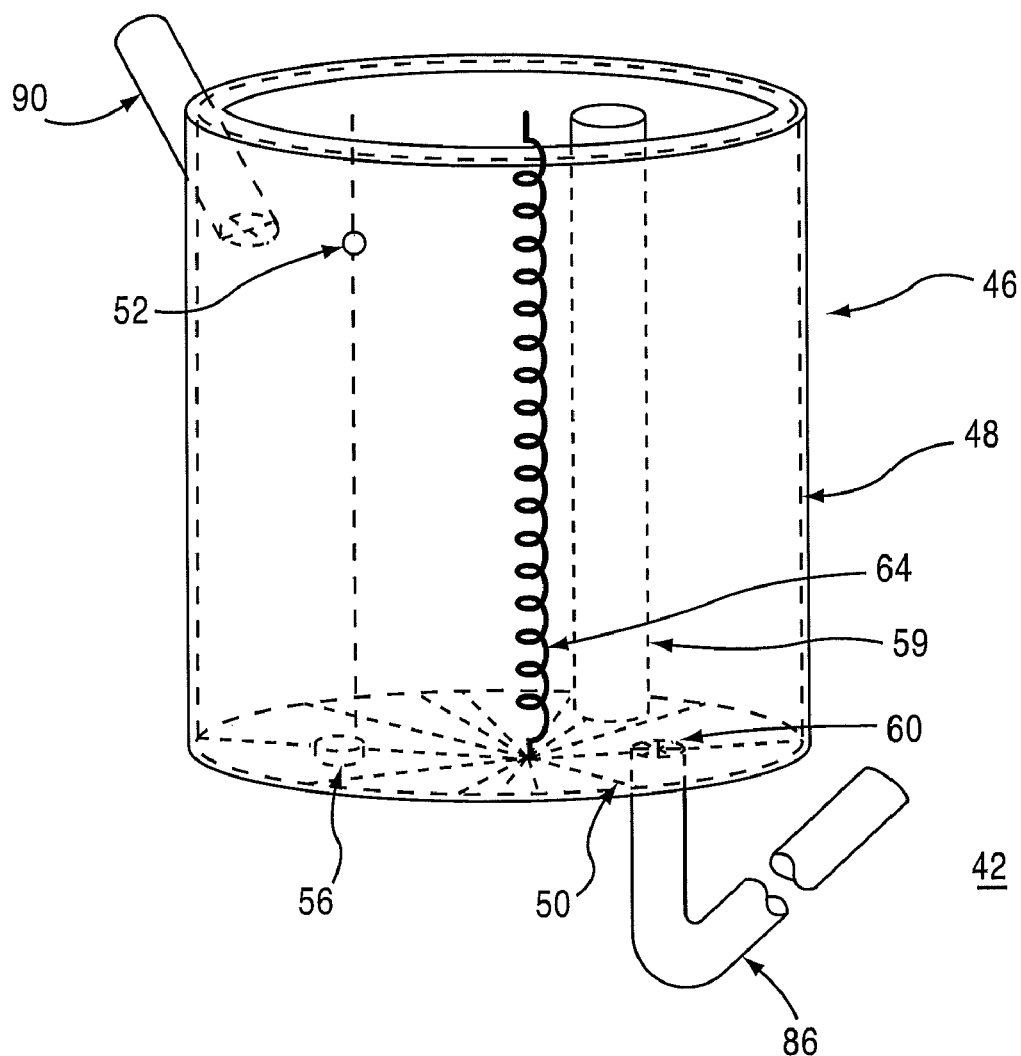
FIG. 4A illustrates a hot water storage tank in accordance with an exemplary embodiment.
Figure 4B:
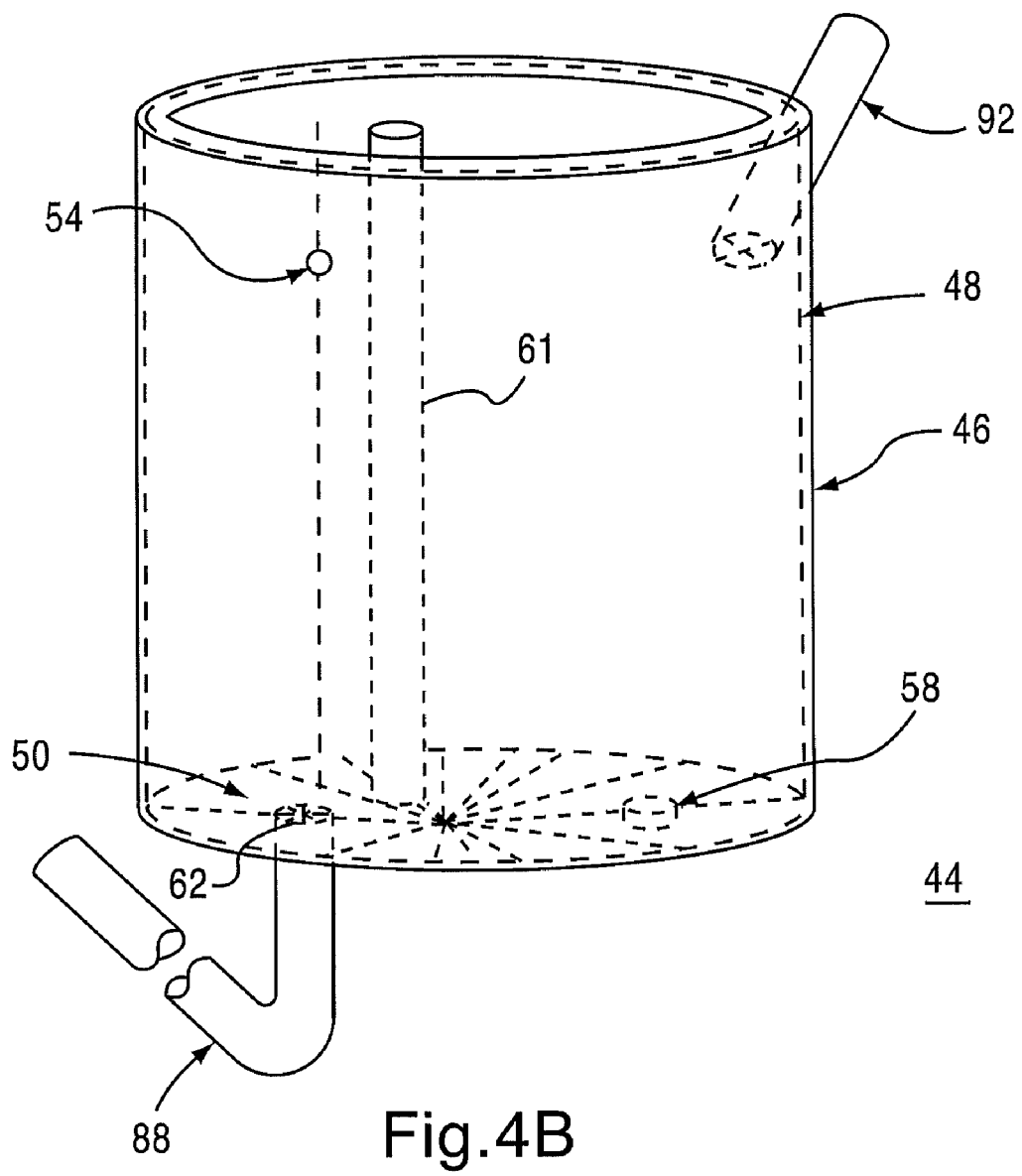
FIG. 4B illustrates a cold water storage tank in accordance with an exemplary embodiment.

FIGS. 4A and 4B illustrate exemplary embodiments of a hot water storage tank 42 and a cold water storage tank 44, respectively. Each storage tank 42 and 44 can be substantially cylindrically shaped, or any other shape as desired, and include an outer surface 46 and an inner surface 48. Both the outer surface 46 and the inner surface 48 can be formed of metallic material. An insulating material can be placed between the outer surface 46 and inner surface 48 to restrict the passage of heat from the inner surface 48 to the outer surface 46. As a result, the hot water storage tank 42 can maintain a "hot" temperature and the cold water storage tank 44 can maintain a "cold" temperature. Each of the storage tanks 42 and 44 also include means, such as a sloped bottom 50 so that the force of gravity can draw or pull stored water to the bottom of each tank. Storage tanks 42 and 44 can be configured to include means, such as float assemblies 52 and 54, for detecting the fill levels of each tank 42 and 44, respectively. The storage tanks 42 and 44 can also include means, such as water purity sensors 56 and 58, for detecting the levels of impurities present in the stored water. Each of the storage tanks 42 and 44 can also be configured to include water drains 60 and 62, for draining water out of the storage tanks 42 and 44, respectively. The hot water storage tank 42 and the cold water storage tank 44 also include pumping pipes 59 and 61, respectively, for connecting to the pumping system 6.

The hot water storage tank 42 also includes means, such as a heating element 64, for heating the water to a desired temperature. The heating element 64 can be thermostatically-controlled so that the desired water temperature can be maintained.

Returning to FIG. 3, the pumping system 6 includes a hot water pump assembly 66 and a cold water pump assembly 68.

The pump assemblies 66 and 68 provide a means for conveying water from the storage tanks 42 and 44, respectively, to the plumbing system 8. Pump assemblies 66 and 68 can be configured such that they are lightweight, compact, and have internal parts that are corrosion-resistant. Additionally, in an exemplary embodiment, each pump assembly 66 and 68 is configured to have an energy-efficient, continuous-duty electric motor that is rated to produce a gallon per minute (GPM) capacity such as 2 GPM, for example, that is sufficient for constant use and thorough washing practices.

The plumbing system 8 includes a hot water supply pipe 70, a cold water supply pipe 72, a mixing chamber 74, a drainpipe 76, a hot water return pipe 78, a cold water return pipe 80, and a water diversion pipe 82.

The water supply pipes 70 and 72 are connected to the pump assemblies 66 and 68, respectively. The water supply pipes 70 and 72 can be configured to route water away from respective water storage tanks 42 and 44 in a direction towards the faucet 26.

The mixing chamber 74 is connected to receive water from the water supply pipes 70 and 72. As shown in FIG. 3, the water supply pipes 70 and 76 are connected to opposite ends of the mixing chamber 74. The mixing chamber 74 mixes hot and cold water flowing from storage tanks 42 and 44, respectively, prior to the water flowing out of the faucet 26. The drainpipe 76 is connected to the drain 30 of the sink assembly 22. The drainpipe 76 receives water flowing from the receptacle 28 and is connected to output the received water to the filtration system 10. Stated differently, the drainpipe 76 allows water to flow in a direction from the sink assembly 22 to the water storage tanks 42 and 44.

The water return pipes 78 and 80 are connected to receive water from the filtration system 10 and allow the water to flow into the water storage tanks 42 and 44, respectively. One of ordinary skill will appreciate that the hot water return pipe 80 is connected to the hot water storage tank 42, and the cold water return pipe 80 is connected to the cold water storage tank 44. The cold water return pipe 80 can be a thermal-conductive pipe that includes longitudinal fins (not shown) extending along its length. Each fin can have a large surface area that radiates heat away from the water flowing through the return pipe 78.

The water diversion pipe 82 is connected between the hot water return pipe 78 and the cold water return pipe 80, for diverting water from either of the water return pipes 78 and 80 to the other water return pipe 80 and 78. Thus, the water diversion pipe 82 diverts water into either the hot water storage tank 42 or cold water storage tank 44, as needed.

The plumbing system 8 also includes a hot water outlet drainpipe 86, a cold water outlet drainpipe 88, a hot water inlet pipe 90, and a cold water inlet pipe 92.

The water outlet drainpipes 86 and 88 are connected to the bottoms of the water storage tanks 42 and 44, respectively, and enable the draining water to flow from the associated storage tank as needed. Each of the outlet drainpipes 86 and 88 include outlet valves 94 and 96, respectively, for enabling water to flow from storage tanks 42 and 44, respectively. The outlet drainpipes 86 and 88 can be of varying lengths and configurations suitable for draining water from the respective storage tank. For example, the outlet drainpipes 86 and 88 can have a 90° bend and extend into a rear side of the enclosure base 20. (See FIG. 6). Each of the outlet drainpipes 86 and 88 can include outlet plugs (not shown) for closing the outlet drainpipes 86 and 88 when the outlet valves 94 and 96 are closed.

The inlet pipes 90 and 92 have one end connected to the water storage system 4 and the other end connected to a rear side of the enclosure 18. For example, the hot water inlet pipe 90 is connected to the hot water storage tank 42 and the cold water inlet pipe 92 is connected to the cold water storage tank 44. One of ordinary skill will appreciate that unless described otherwise the piping of the plumbing system 8 is made of a material that provides high strength and durability, such as polyvinyl chloride (PVC) or other suitable material as desired.

The filtration system 10 includes a hot water filtration system 98 and a cold water filtration system 100. The hot and cold filtration systems 98 and 100 include a hot water prefilter 102 and a cold water prefilter 104, respectively. The prefilter assemblies 102 and 104 are provided for filtering particulate matter and other contaminants from the water as the water flows from the drainpipe 76 to the storage tanks 42 and 44. Each prefilter assembly 102 and 104 can be configured to filter the water supply without significant constriction. The prefilter assemblies 102 and 104 can be formed of materials such as paper or any other material that can be washable, reusable, is lightweight, and compact. Moreover, each prefilter assembly 102 and 104 can be formed of a material having a capability to filter solids and impurities from the water supply for an extended period (e.g., three to six months, depending on frequency of use) before being replaced.

The hot and cold filtration systems 98 and 100 also include a hot water media filter 106 and a cold water media filter 108, for further filtering the water that has passed through the prefilter assemblies 102 and 104. Each media filter assembly 106 and 108 can be formed of any material, such as charcoal, or any other suitable material as desired, that provides a large filtration surface area for separating and holding impurities, such as soap, from the water supply. Moreover, the media filter assemblies 106 and 108 can also be formed of a material that is lightweight and compact, and can purge solids and impurities from the water supply for an extended period of time (e.g., at least three to six months) before needing replacement. The media filters 106 and 108 are connected to output the filtered to return pipes 78 and 80, respectively.

Figure 5:
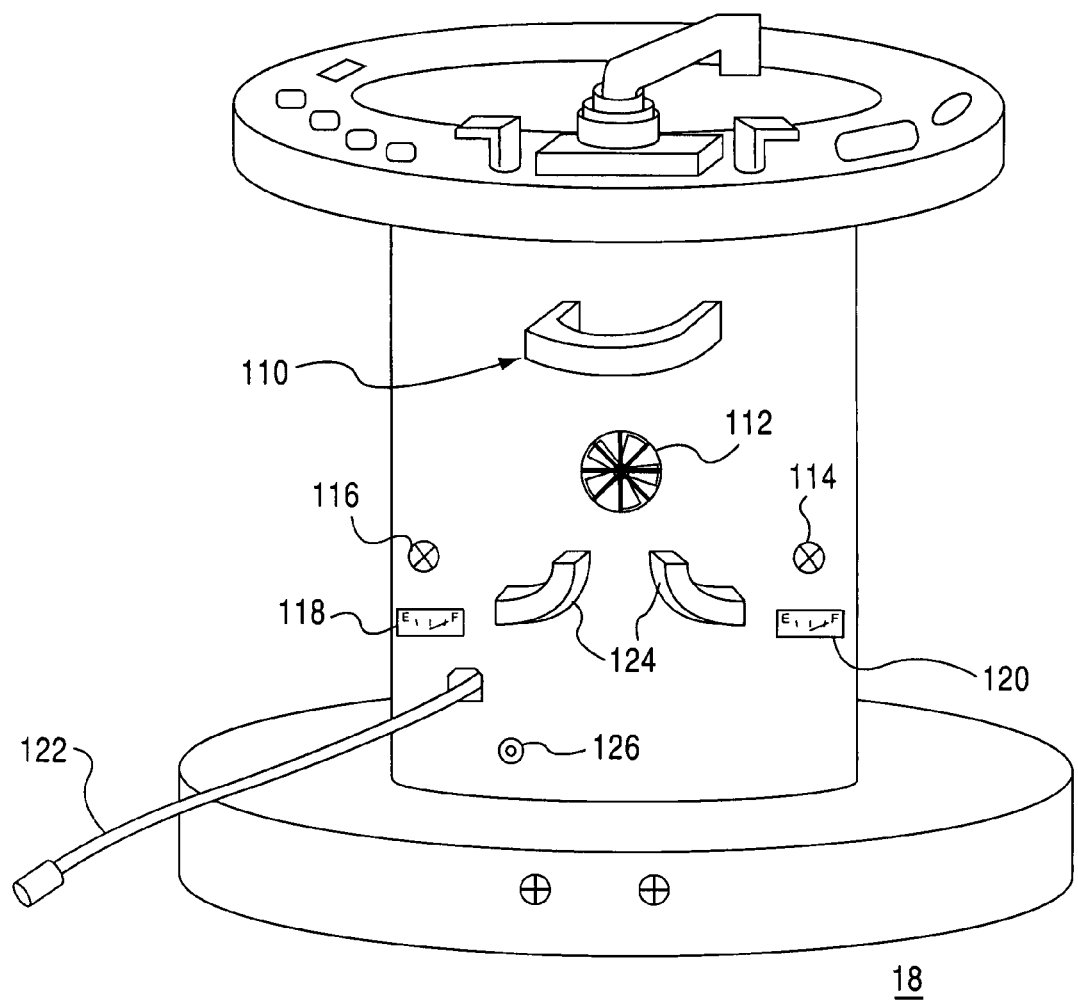
FIG. 5 illustrates a perspective view of an enclosure in accordance with an exemplary embodiment.

FIG. 5 is an exemplary perspective of a rear side of the enclosure 18. As shown in FIG. 5, the enclosure 18 includes a carry handle 110 that is securely mounted to the rear surface. The enclosure 18 also includes a tubeaxial fan 112 that draws heat from the cold water return pipe 80 and exhausts the heat outside of the enclosure 18. The enclosure 18 also includes a hot water tank inlet 114 and a cold water tank inlet 116 for filling the hot water storage tank 42 and the cold water storage tank 44, respectively. One of ordinary skill will appreciate that the water tank inlets 114 and 116 are formed by the exposed end of the corresponding water inlet pipes 90 and 92, respectively. Moreover, water inlet/outlet plugs are removably inserted into the water tank inlets 114 and 116 when the tanks are not being refilled.

The enclosure 18 also includes a hot water tank gauge 118 and a cold water tank gauge 120 that are connected to the water float assemblies 52 and 54, respectively. The tank gauges 118 and 120 display a real-time water level in each of the respective water storage tanks 42 and 44 based on a signal received from the water float assemblies 52 and 54, respectively. The tank gauges 118 and 120 can be implemented in any of an analog or digital device as desired. The enclosure 18 includes a power cord 122 and power cord holder 124. The power cord 122 is connected to a 110 volt AC power source and supplies this voltage and current to the power system 14. The power cord holder 124 is provided as a means for storing the power cord on the enclosure 18. The enclosure 18 also includes a power jack 126, for connecting a 12 volt DC power source to the power system 14.

Figure 6:
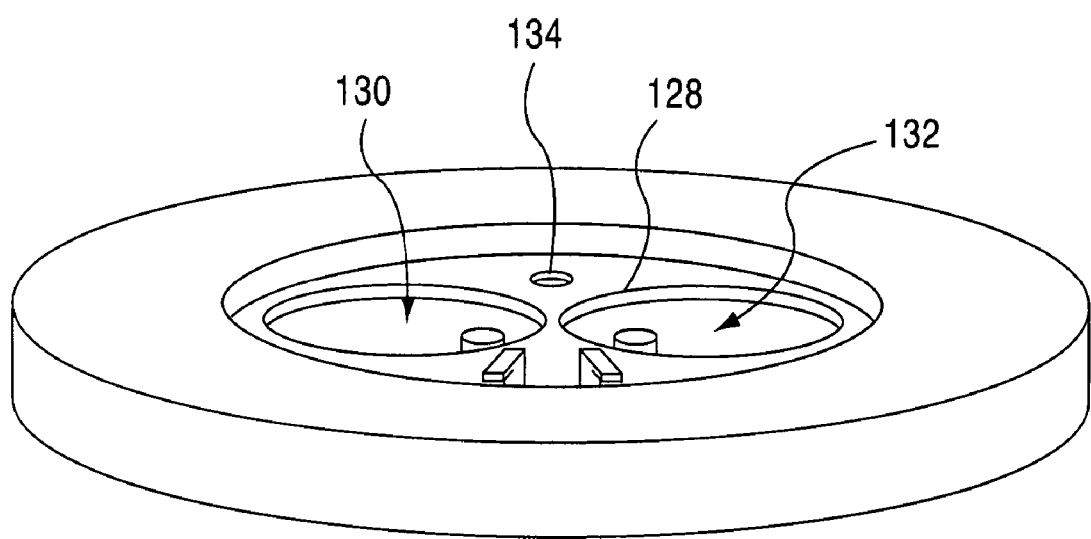
FIG. 6 illustrates an enclosure base in accordance with an exemplary embodiment.

FIG. 6 illustrates an exemplary perspective of the enclosure base 20. As shown in FIG. 6, the enclosure base 20 includes a main recessed area 128 and two secondary recessed areas 130 and 132. The main recessed area 128 is provided for receiving and supporting the enclosure 18. The secondary recessed areas 130 and 132 are provided for receiving and supporting the hot water storage tank 42 and the cold water storage tank 44, respectively. The enclosure base 20 also includes outlet drainpipes 86 and 88 for draining water from the water storage tanks 42 and 44, respectively. As further illustrated in FIG. 6, the enclosure base includes a moisture sensor recessed area 134 for receiving a moisture sensor 136 that is mounted on a bottom surface of the enclosure 18. The enclosure base 20 also includes water outlet valves 94 and 96 for regulating the flow of water that is drained from the water storage tanks 42 and 44, respectively.

Revisiting FIG. 3, the control system 12 includes a controller 138 for providing power to various components such as the pumping system 6, the heating element 64 of the hot water storage tank 42, sensor valves SV1-SV6, and the tubeaxial fan 112. The power level supplied to the pumping system can be dependent on the position the hot and/or cold water valves 32 and 34 of the sink assembly 22.

The control system 12 can be implemented as a printed circuit board (PCB), programmable logic device, a programmable controller, or any other suitable processing device as desired. The control system can be connected to the power system 14 and distribute power to the various systems and electrical components as needed. The control system 12 can also be configured to provide data management services for the hand sink 2.

To distribute power and data to various components of the handsink 2 the controller 138 can be connected to a wiring harness or other suitale device for facilitating communication. The wiring harness can be formed of waterproof material and can be anchored to various points within the handsink 2 through means, such as cable ties and cable tie mounting bases, or other suitable mounting devices. The controller 138 intermittently provides power to the heating element 64 based on the temperature setting provided by user or operator. Sensor valves SV1-SV6 are discussed in detail below. The controller 138 supplies power to each valve SV1-SV6 as needed to control the flow of water through the plumbing system 8.

The tube axial fan 112 provides means for drawing heat from water flowing through the cold water return pipe 80. The tubeaxial fan 112 is mounted in the enclosure 18, delivers high cubic feet per minute (CFM) capacity of air to draw heat from the cold water return pipe 80 and exhaust the heat from the enclosure 18. As a result, water returning to the cold water storage tank 44 via the cold water return pipe 80 is at a relatively cool temperature.

The controller 138 also distributes power to the pumping system 6 based on the position of the hot and cold water valves 32 and 34 of the sink assembly 22. For example, the water valves 32 and 34 can rotate within a range of 45°. The "low" end of the motion range corresponds to "low" power signal being distributed by the controller 138 to the corresponding pump. The "high" end of the motion range corresponds to a "high" power signal being distributed by the controller to the corresponding pump. One of ordinary skill will appreciate that the hot and cold water valves 32 and 34 can be activated independently of each other or simultaneously to obtain the desired water temperature.

The controller 138 can also be configured to supply power to LED indicators 38A-38D which are mounted on the sink assembly 22. For example, the controller 138 can be configured to generate a power indication signal when either of the water valves 32 and 34 are open and water is flowing through the plumbing system 8. In another example, the controller 138 can be configured to generate a water change signal for illuminating the water change indicator 38B when the hot water purity sensor 56 or the cold water purity sensor 58 determines that the stored water does not meet a predetermined purity standard. The controller 138 can be configured to generate a filter change signal at specified intervals, such as three months or after a specified number of hand wash cycles have been tallied, so that the filtration system 10 can be serviced. The controller 138 can also be configured to generate a failure signal to drive the failure indicator, when the controller 138 detects a problem or failure in any of the electronic components of the handsink 2. When the controller 138 receives failure signals from any of the electronic components of the handsink 2, the controller 138 can generate a failure control signal that corresponds to an associated failure mode. The display 40 receives the failure control signal from the controller 138 and can be configured to display the corresponding failure mode to the operator or user.

The controller 138 can also be configured to perform data management services. For example, the controller 138 can be configured to receive a signal from the hot and cold tank float assemblies 52 and 54, for monitoring the water levels in the water storage tanks 42 and 44, respectively. In this manner, the controller 138 can track the maximum detected fill level of each tank. As described herein, the maximum detected fill level indicates the maximum amount of water each storage tank 42 and 44 receives at the next refill interval. The controller 138 can also be configured to receive signals from the water purity sensors 56 and 58 for monitoring the purity level of water stored in the water storage system 4. When the water purity data is not within a predefined range or does not meet a predetermined threshold, the controller 138 activates the water change indicator 38B to notify the user to change the water in the water storage system 4.

The controller 138 is also configured to receive data from the moisture sensor 136. The controller 138 can activate the failure indicator 38D and/or the display 40 if moisture or a leak is detected. The controller 138 can also be connected to receive data from an anti-tip sensor 140. The anti-tip signal can be securely mounted to an inner surface of the enclosure 18 and can be implemented as an accelerometer or other suitable device for providing angular acceleration readings of the handsink 2. If the angular acceleration readings meet or exceed a threshold valve, such as 1 g (gravitational-force), for example, the controller 138 closes all sensor valves SV1-SV6 to prevent the back flow of water from the water storage system 4 to the drainpipe 76.

The power system 14 includes a power supply 142, for supplying power to the handsink 2. The power supply 142 is connected to receive 110 volt AC power through a power cord. The power supply 142 steps down the 110 volt AC to a level safe enough to distribute to the controller 138. The power system 14 also includes a rechargeable battery 144 for providing power to the handsink 2 when the handsink 2 is not connected to a main power source through power supply 142. The rechargeable battery 144 can include lithium ion, nickel-cadmium, or other suitable conductive material that can be charged and recharged many times. The power system 14 further includes a wiring harness 146 for directing signals from the controller 138 to the various components within the handsink 2.

Figure 7:
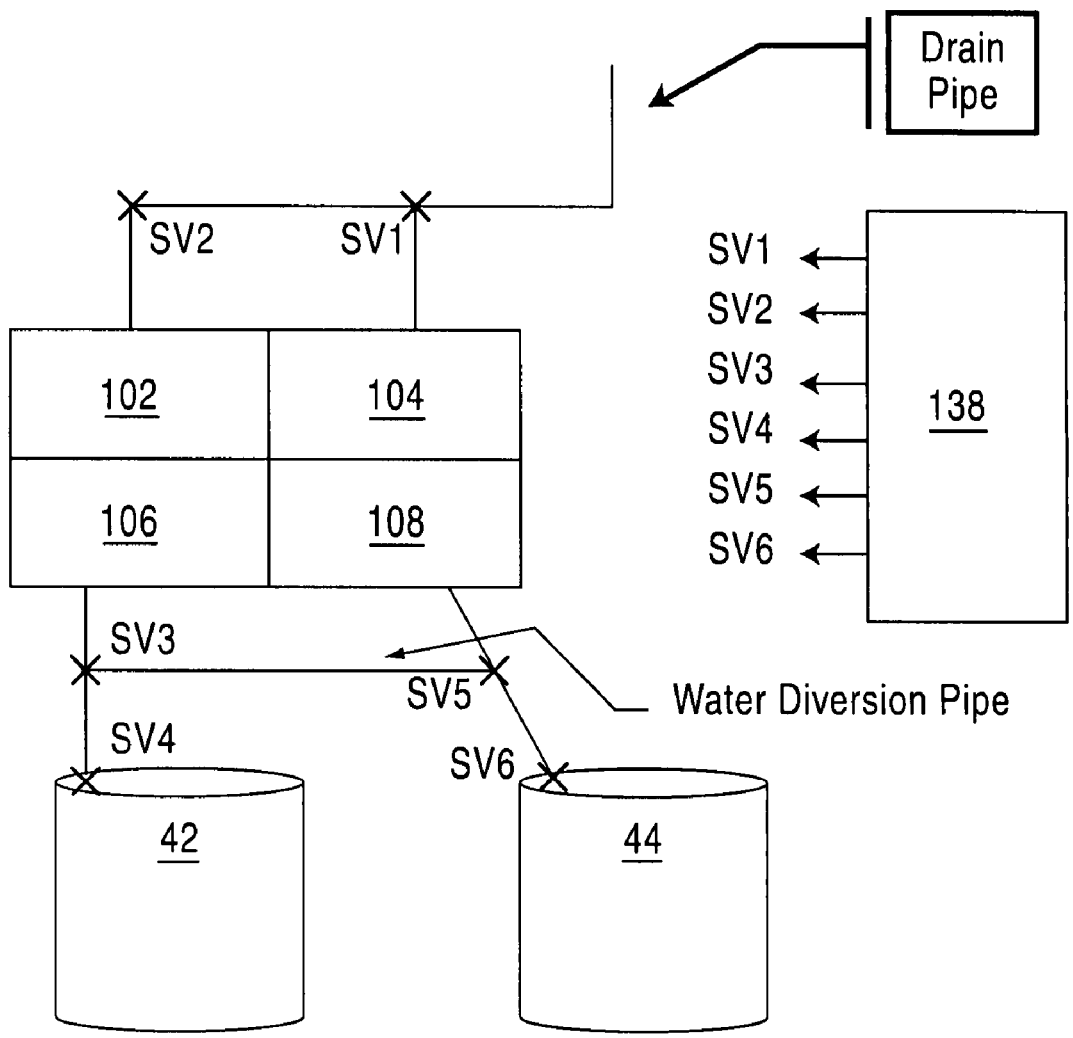
FIG. 7 illustrates a water diversion system in accordance with an exemplary embodiment.

FIG. 7 is an exemplary water diversion system 5 of the handsink 2. The water diversion system 5 can be implemented through the plumbing system 8, control system 12, and sensor valves SV1-SV6.

Sensor valves SV1, SV3, and SV5 are bidirectional valves that allow water to flow in two directions. Sensor valve SV1 can be placed in the drain pipe connection that leads to the cold water tank prefilter 104. Sensor valve SV3 can be located at a portion of the plumbing system 8 between the hot water tank media filter 106 and the hot water storage tank 42, and on an end of the water diversion pipe 82. Sensor valve SV5 can be located on an opposite end of the water diversion pipe 82 from sensor valve SV3, and is between the cold water tank media filter 108 and the cold water storage tank 44. Sensor valves SV1, SV3 and SV5 can be configured to allow water to flow in only one direction, in both directions, or not at all, depending upon the operating state of the handsink system.

Sensor valves SV2, SV4, and SV6 are unidirectional valves that allow water to flow in only one direction regardless of the operating condition of the handsink system. In some operating states, sensor valves SV2, SV4, and SV6 can prohibit the flow of water. As shown in the figure, sensor valve SV2 is located on a portion of the drain pipe 76 that is downstream from sensor valve SV1 and leads into the hot water tank prefilter 102. Sensor valve SV4 is located on an end of the hot water return pipe 78 that is connected to the hot water storage tank 42. Sensor valve SV6 is located on an end of the cold water return pipe 80 that is connected to the cold water storage tank 44.

The water diversion system 5 is activated when the hot and cold water valves 32 and 34 are "activated" (e.g., "opened"). When the hot and/or cold water valves 32 and 34 are open, the corresponding water pump assemblies 66 and 68 is activated by controller 138 to pump water from either or both of the hot and cold water storage tanks 42 and 44, as needed. Once the pump assemblies 66 and 68 are activated, the hot and cold water float assemblies 52 and 54 move from their maximum detected fill levels. The maximum detected fill level of each storage tank is the maximum amount of water the respective storage tank receives at the next refill interval or prior to each washing cycle. The controller 138 is connected to receive data from the float assemblies 52 and 54 that indicates that maximum detected fill level. The controller 138 stores the maximum detected fill level for each of the hot and cold water storage tanks 42 and 44 and updates these values each time the handsink 2 is powered up. Based on the amount of change in the maximum detected field level for a respective storage tank, the controller 138 sends a signal to adjust (i.e., open or close) the appropriate sensor valve in the water diversion system 5.

The water diversion system 5 can operate in one of six states. The conditions that define each state are defined in Table 1.

TABLE 1

|  | Condition | |
| --- | --- | --- |
| Operating State | Hot water valve | Cold water valve |
| 1 | OPEN | CLOSED |
| 2 | CLOSED | OPEN |
| 3 | OPEN | OPEN |
| 4 | OPEN/CLOSED at $t_1$ | OPEN/CLOSED at $t_2$ |
| 5 | OPEN/CLOSED at $t_2$ | OPEN/CLOSED at $t_1$ |
| 6 | OPEN/CLOSED at $t_1$ | OPEN/CLOSED at $t_1$ |

Figure 8:
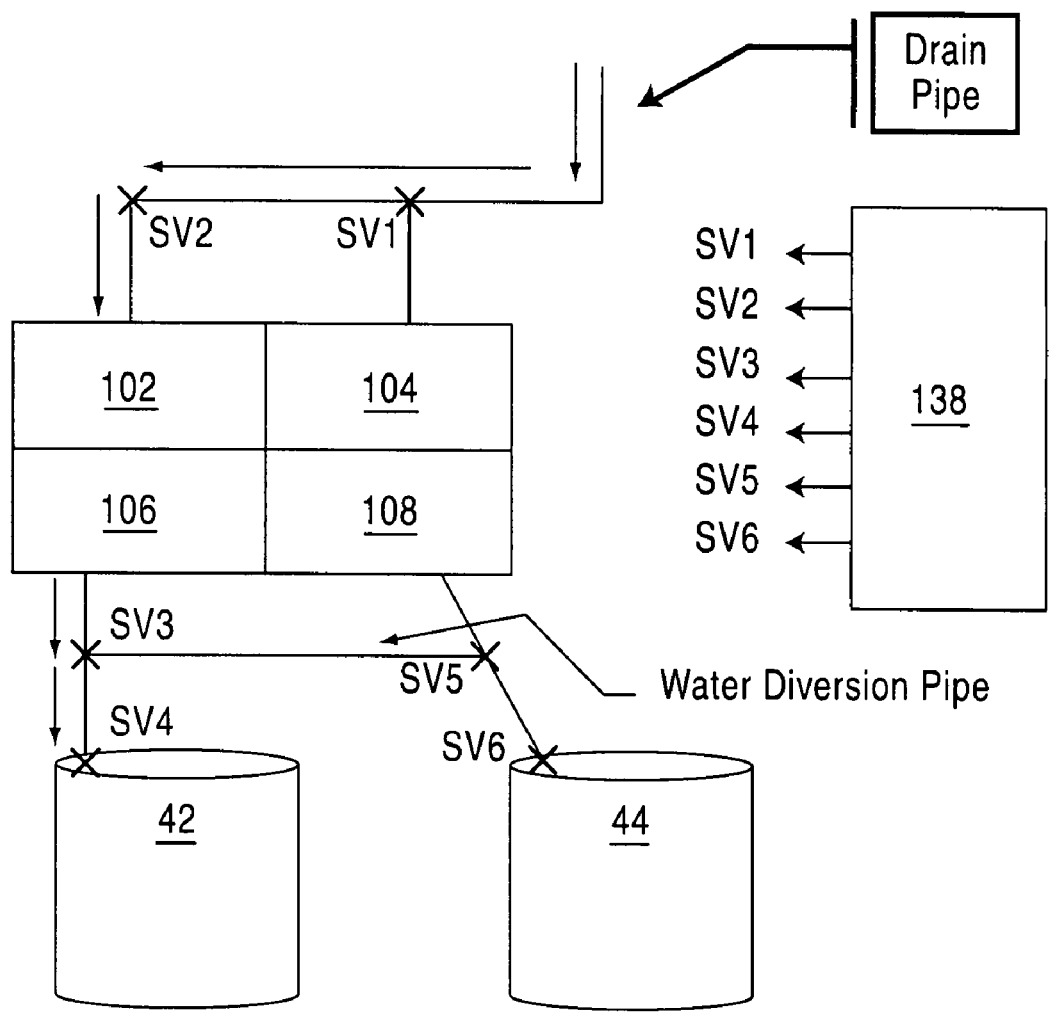
FIG. 8 illustrates a first state of the water diversion system in accordance with an exemplary embodiment.

FIG. 8 illustrates operating state 1 of the water diversion system 5. In operating state 1, the hot water valve 32 is in the open and the cold water valve 34 is closed. The controller 138 receives water level data from the hot and cold water float assemblies 52 and 54 with respect to the hot and cold water storage tanks 42 and 44, respectively. Because only the hot water valve 32 is open, the controller 138 sends control signals to the sensor valves such that sensor valve SV1 is adjusted to prohibit water flow to the cold water filtration system 100, and allow water to flow to the sensor valve SV2. Sensor valve SV2 permits water to flow into the hot water filtration system 98. Sensor valve SV3 is adjusted to permit water flow to the hot water storage tank 42 and prohibit water flow through the water diversion pipe 82. Sensor valve SV4 is adjusted to permit water flow to the hot water storage tank 42. Sensor valves SV5 and SV6 are closed.

Figure 9:
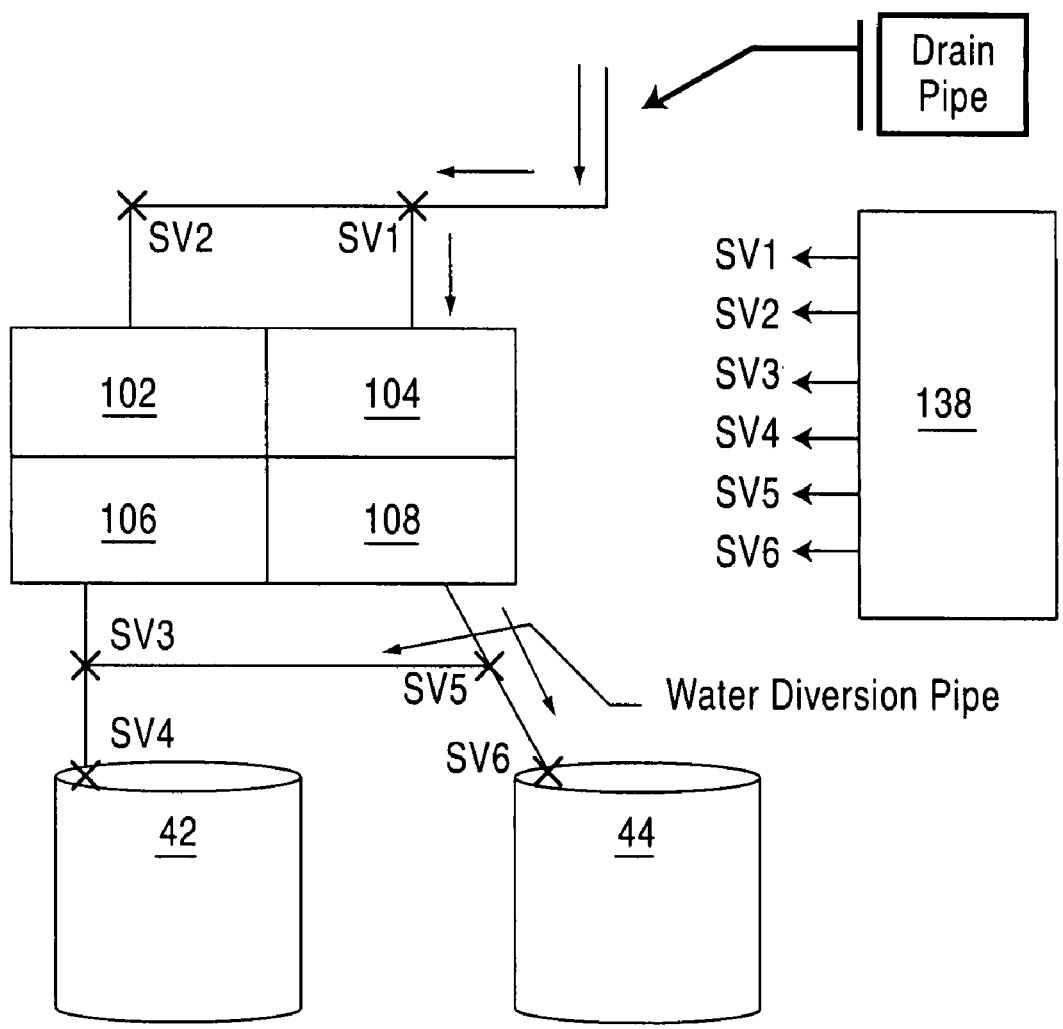
FIG. 9 illustrates a second state of the water diversion system in accordance with an exemplary embodiment.

FIG. 9 illustrates operating state 2 of the water diversion system 5. In state 2, the hot water valve 32 is closed and the cold water valve 34 is open. Based on the water level readings received from the hot and cold float assemblies 52 and 54 with respect to the hot and cold storage tanks 42 and 44, respectively, the controller 138 generates control signals such that sensor valve SV1 permits water flow to the cold water filtration system 100, and prohibits water flow to sensor valve SV2. Sensor valve SV5 is adjusted to permit water flow to the cold water storage tank 44 and prohibit water flow to the water diversion pipe 82. Sensor valve SV6 is adjusted to permit water flow to the cold water storage tank 44. Sensor valves SV2, SV3, and SV4 are closed.

Figure 10:
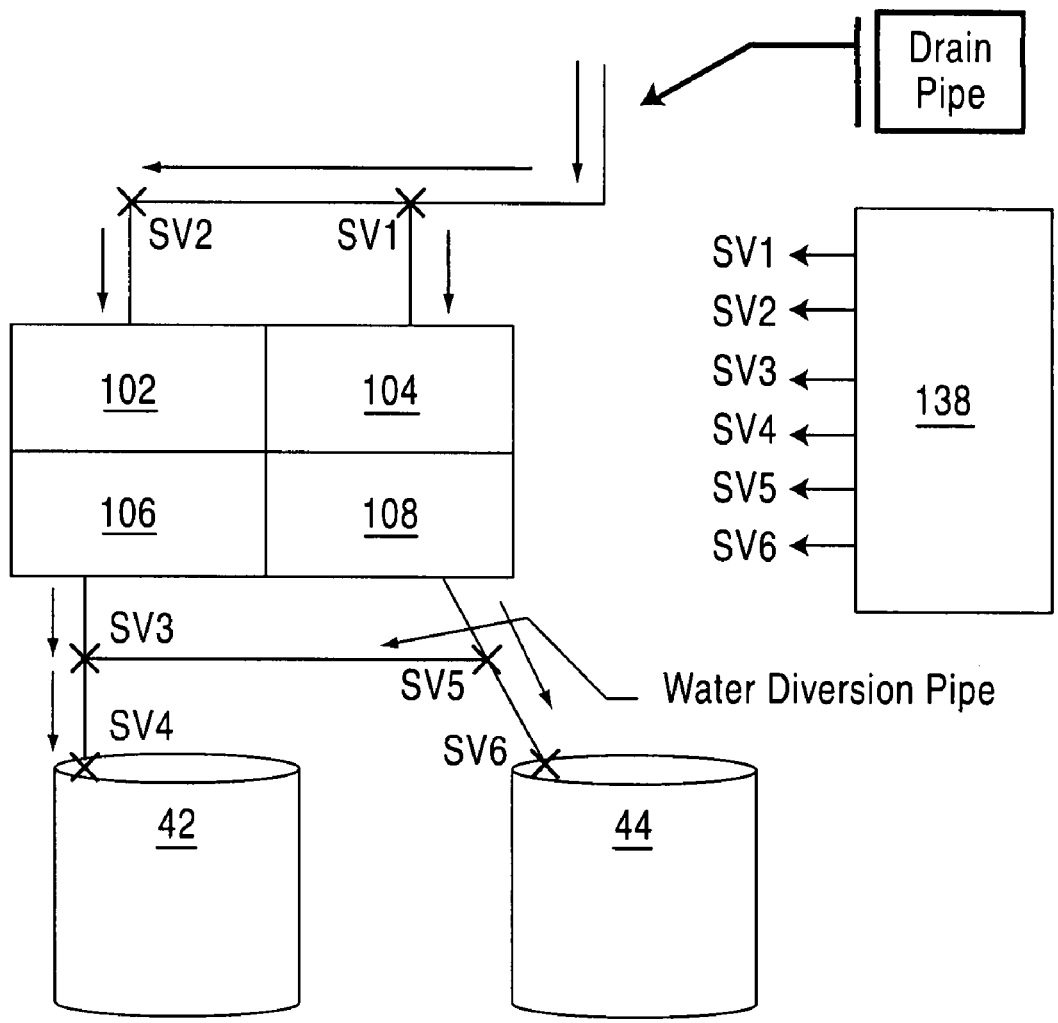
FIG. 10 illustrates a third state of the water diversion system in accordance with an exemplary embodiment.

FIG. 10 illustrates operating state 3 of the water diversion system 5. In operating state 3, both the hot water valve 32 and cold water valve 34 are open. The controller 138 receives water level data from the hot and cold water float assemblies 52 and 54 with respect to the water levels in the hot and cold water storage tanks 42 and 44, respectively. Based on the received water level data, the processor generates control signals to adjust the sensor valves SV1-SV6. For example, sensor valve SV1 is adjusted to permit water flow to the cold water filtration system 100, and permit water flow to sensor valve SV2. Sensor valve SV2 is adjusted to permit water flow to hot water filtration system 98. Sensor valve SV3 is adjusted to permit water flow to the hot water storage tank 42 and prohibit water flow to the water diversion pipe 82. Sensor valve SV4 is adjusted to permit water flow to the hot water storage tank 42. Sensor valve SV5 is adjusted to permit water flow to the cold water storage tank 44 and prohibit water flow to the water diversion pipe 82. Sensor valve SV6 is adjusted to permit water flow to the cold water tank 44.

Figure 11:
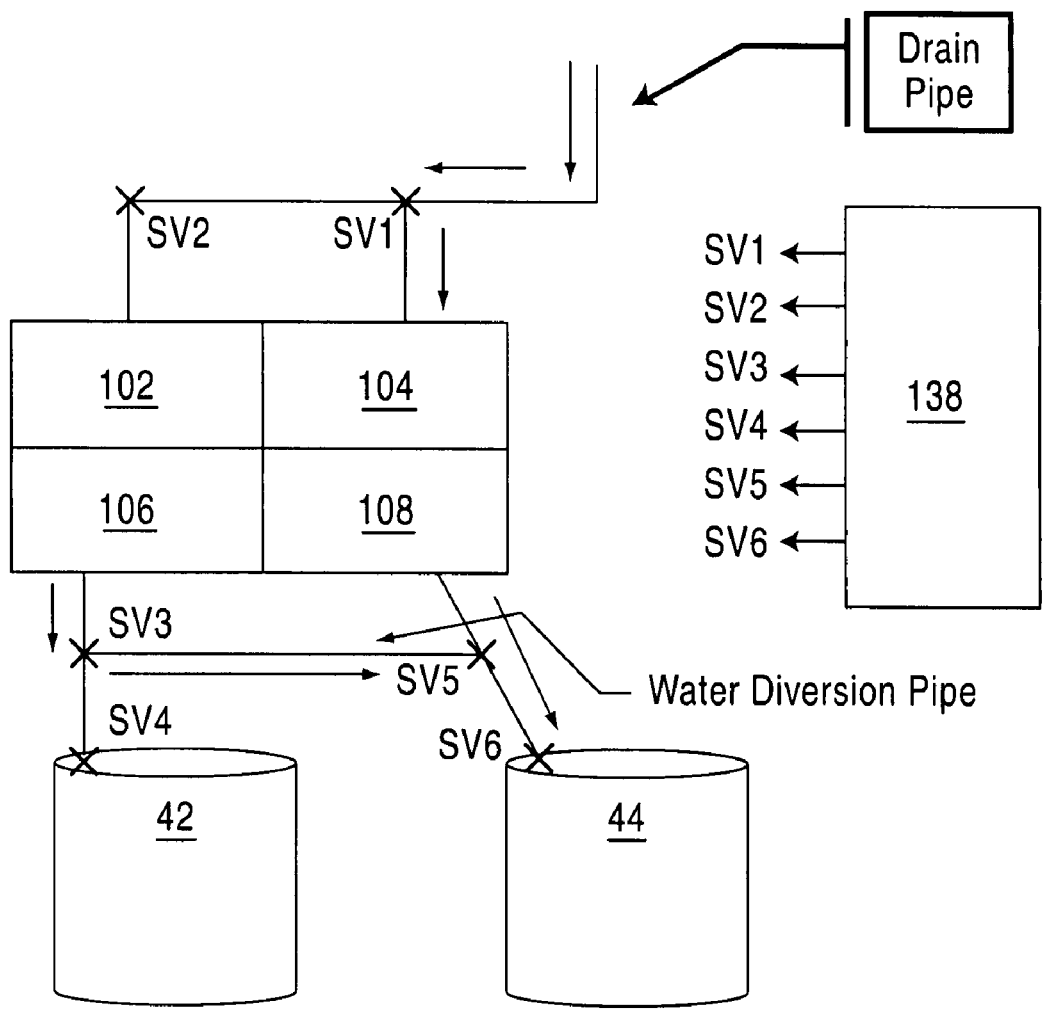
FIG. 11 illustrates a fourth state of the water diversion system in accordance with an exemplary embodiment.

FIG. 11 illustrates an operating state 4 of the water diversion system 5. In operating state 4, both the hot water valve 32 and the cold water valve 34 are initially open at a time t1. The hot water valve 32 is closed at a time t2 while the cold water valve 34 remains open. The controller 138 receives water level data from the hot and cold water float assemblies 52 and 54 with respect to the water levels in each of the hot and cold water storage tanks 42 and 44, respectively. Based on the received water level data, the controller 138 generates control signals to adjust the position of sensor valves SV1-SV6 as needed. For example, sensor valve SV1 is adjusted to permit water flow to the cold water filtration system 100. Because both the hot water valve 32 and the cold water valve 34 are open at a time t1, the controller 138 continuously monitors both the hot and cold water float assemblies 52 and 54. Based on this continuous monitoring, controller 138 generates a control signal so that the sensor valve SV1 prohibits water flow to sensor valve SV2 when the hot water float assembly 52 indicates that the maximum detected fill level in the hot water storage tank 42 has been reached.

Sensor valve SV2, while initially open at time t1, is adjusted to a closed position when the hot water float assembly 52 in the hot water storage tank 42 indicates that the maximum detected fill level of the hot water storage tank 42 has been reached. Initially, at a time t1, the sensor valve SV3 is adjusted to permit water flow to sensor valve SV4. After time t2, when the hot water valve 32 is closed, the controller 138 adjusts the sensor valve SV3 to prohibit water flow to sensor valve SV4 when the hot water tank float assembly 52 detects that the maximum detected fill level of the hot water storage tank 42 has been reached. The sensor valve SV3 also diverts any water leaving the hot water media filter 106 to the water diversion pipe 82. Sensor valves SV5 and SV6 are adjusted to permit all water flowing from the water diversion pipe 82 and the cold water return pipe 80 to the cold water storage tank 44. At a time t1, sensor valve SV4 permits water flow to the hot water storage tank 42. After a time t2, and when the maximum detected fill level in the hot water storage tank 42 has been reached, the sensor valve SV4 is closed.

Figure 12:
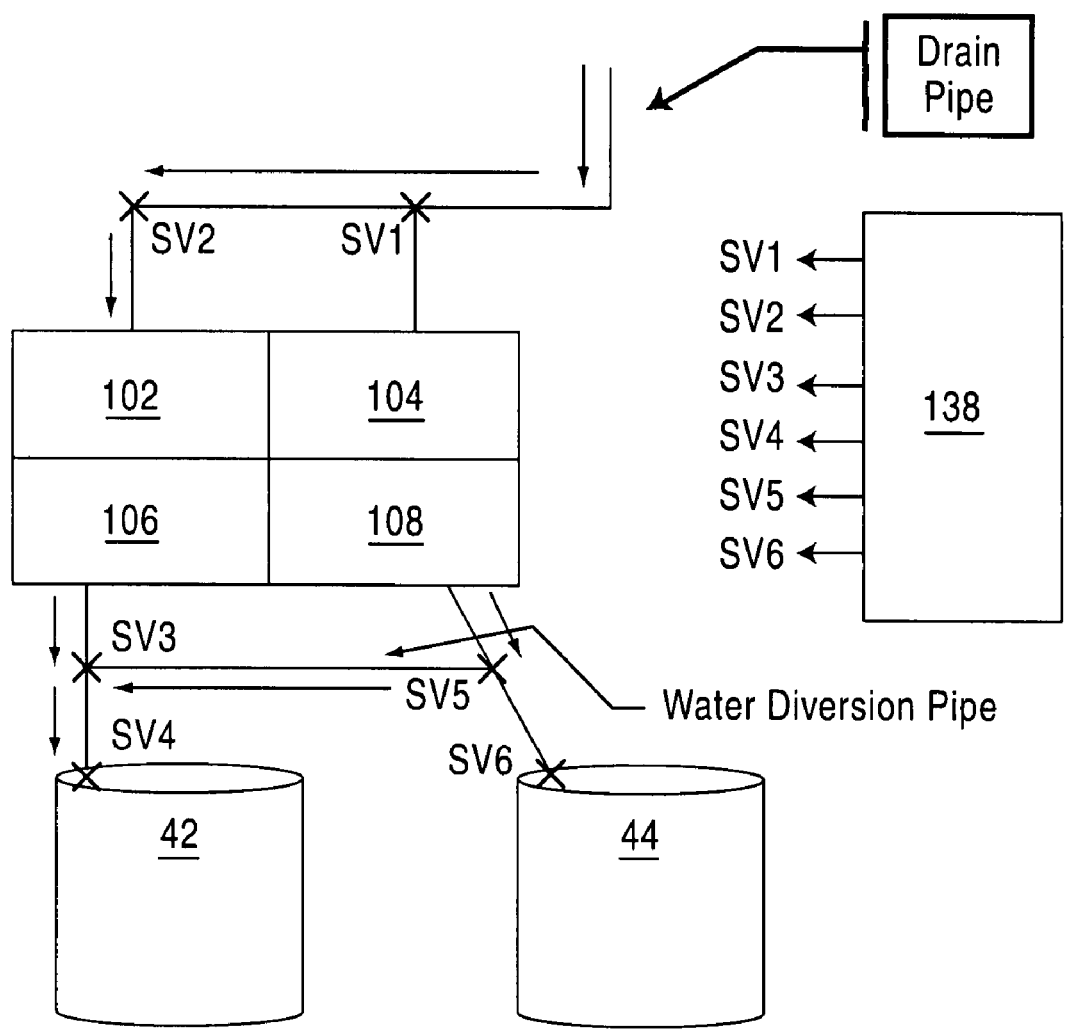
FIG. 12 illustrates a fifth state of the water diversion system in accordance with an exemplary embodiment.

FIG. 12 illustrates an operating state 5 of the water diversion system 5. In operating state 5, at a time t1, the hot water valve 32 and the cold water valve 34 are open. At a time t2, the cold water valve 34 is closed and the hot water valve 32 remains open. The controller 138 receives water level data from both the hot and cold water float assemblies 52 and 54 with respect to the water levels of the hot and cold water storage tanks 42 and 44, respectively. Based on the received water level data, controller 138 adjusts the sensor valves SV1-SV6 as needed. For example, at a time t1, sensor valves SV1-SV6 are open, while sensor valves SV3 and SV5 both prohibit water flow through the water diversion pipe 82. After a time t2, the sensor valve SV1 is adjusted to prohibit water flow to the cold water prefilter filtration system 100 when the cold water float assembly 54 determines that the maximum fill level of the cold water storage tank 44 has been reached. At a time t1 and t2, sensor valve SV2 permits water flow to the hot water filtration system 98. At a time t1, sensor valve SV5 permits water flow to sensor valve SV6. After a time t2, sensor valve SV5 is adjusted to prohibit water flow to sensor valve SV6 and divert any water flow to the water diversion pipe 82, when the cold water tank float assembly 54 detects that the maximum fill level of the cold water storage tank 44 has been reached. At times t1 and t2, sensor valve SV3 and SV4 permit all water flowing from the water diversion pipe 82 and a hot water return pipe 78 to flow into the hot water storage tank 42.

Figure 13:
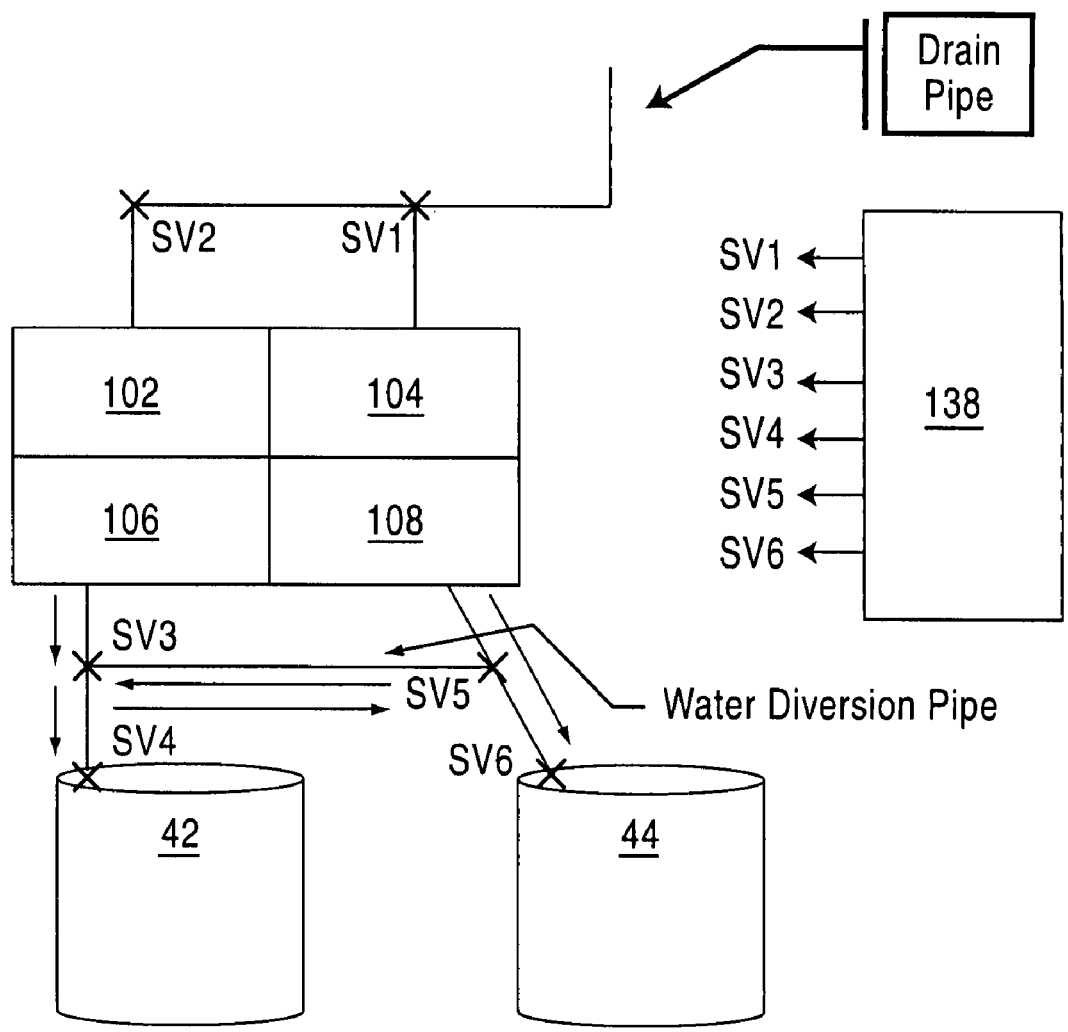
FIG. 13 illustrates a sixth state of the water diversion system in accordance with an exemplary embodiment.

FIG. 13 illustrates an operating state 6 of the water diversion system 52. In operating state 6, at a time t1, both the hot water valve 32 and cold water valve 34 are open and at a time t2, both the hot water valve 32 and cold water valve 34 are closed. At a time t2, sensor valves SV1 and SV2 are adjusted to permit water flow to the hot and cold water filtration systems 98 and 100 until the hot and cold float assemblies 52 and 54 detect that the maximum fill levels of the hot and cold water storage tanks 42 and 44, respectively, have been reached. The adjustment of sensor valves SV1 and SV2 can occur at different times based upon the volume of water delivered from each of the hot and cold water storage tanks 42 and 44. Similarly, after a time t2, sensor valve SV3 permits water flow to sensor valve SV4 until the hot water tank float assembly 52 detects that the maximum fill level of the hot water storage tank 42 has been reached. At this instance, the sensor valve SV3 is adjusted to prohibit water flow to sensor valve SV4 and permit water flow through the water diversion pipe 82. If the maximum fill level in the hot water storage tank 42 is reached before the maximum fill level of the cold water storage tank 44, sensor valves SV5 and SV6 can be adjusted to permit all water flow from the water diversion pipe 82 and the cold water return pipe 80 to flow to the cold water storage tank 44. When the maximum fill level of the hot water storage tank 42 is reached, sensor valve SV4 is adjusted to the closed position.

After a time t2, sensor valve SV5 is allowed to permit water flow to sensor valve SV6 until the cold water float assembly 54 detects that the maximum fill level of the cold water storage tank 44 has been reached. Once the maximum fill level of the cold water storage tank 44 has been reached, sensor valve SV5 is adjusted to prohibit water flow to sensor valve SV6 and permit water flow through the water diversion pipe 82. If the maximum detected fill level of the cold water storage tank 44 is reached before the maximum fill level of the hot water storage tank 42, sensor valves SV3 and SV4 can be permitted to allow all water flow from the water diversion pipe 82 and hot water return pipe 78 to flow into the hot water storage tank 42. Once the maximum fill level of the cold water storage tank 44 is reached, sensor valve SV6 is closed.

Figure 14:
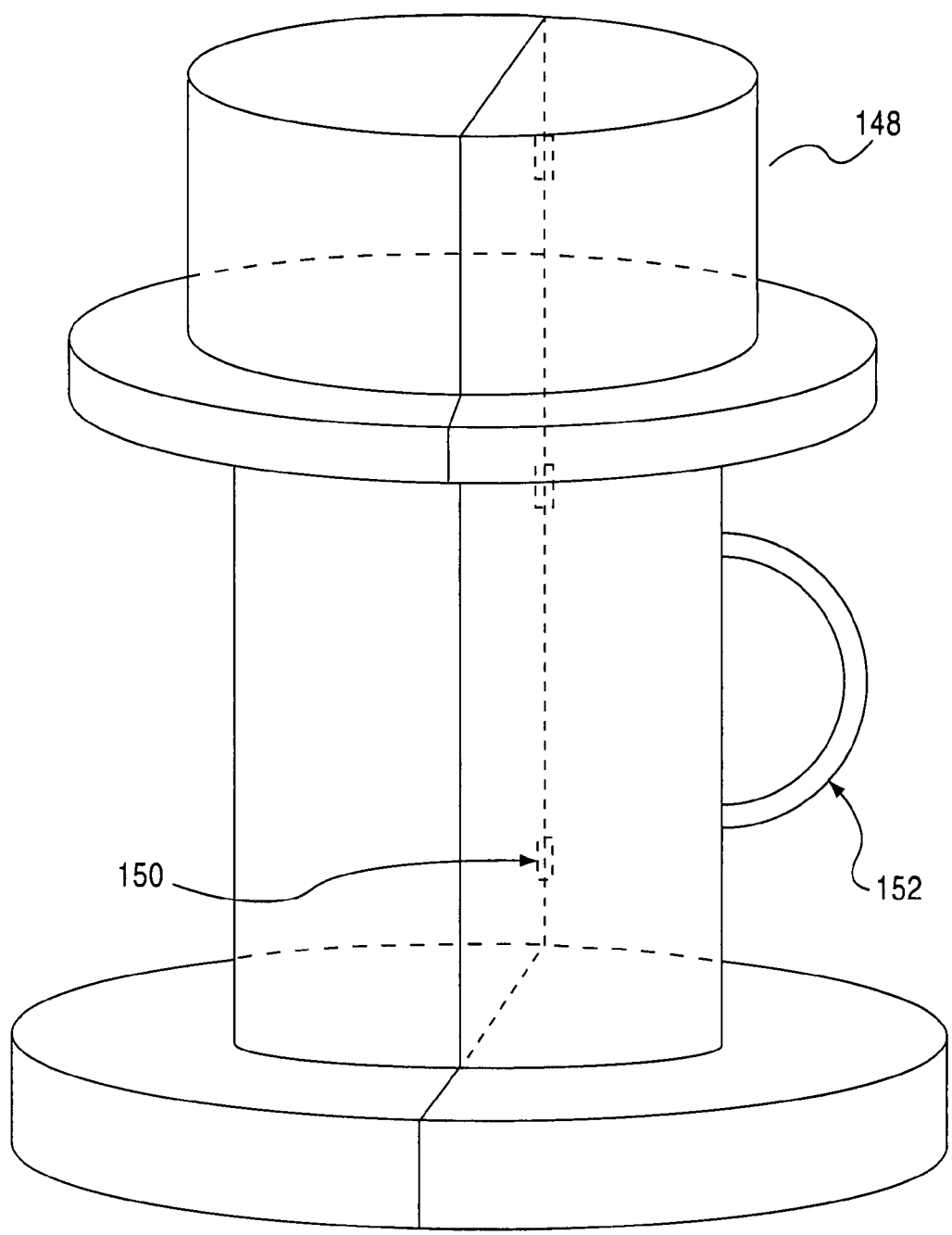
FIG. 14 illustrates a protective cover in accordance with an exemplary embodiment.

FIG. 14 illustrates an exemplary protective cover for the handsink 2. The protective cover 148 can be used to protect the handsink 2 while being stored or transported. A protective cover 148 can be made from ABS or other suitable material having a highly durability. The protective cover 148 can be formed in a shape of a clamshell, for example, so that the protective cover 148 completely encloses the handsink 2. The protective cover 148 includes hinges 150 that fixedly attach to portions of the protective cover 148 so that it may open to a width that is sufficient to capture the handsink 2. The protective cover 148 also includes a carry handle 152 for portability.

While the invention has been described with reference to specific embodiments, this description is merely representative of the invention and not to be construed as limiting the invention. Various modifications and applications may occur to those skilled in the art without departing from the true spirit and scope of. the invention as defined by the appended claims.

What is claimed is:

1. A portable handsink, comprising:
   means for separately storing heated water and non-heated water;
   means for dispensing water from the heated and non-heated water storing means;
   means for circulating water between the storing means and dispensing means;
   means for sensing a level of stored water;
   means for controlling a direction of water circulation into the heated and non-heated storing means based on the sensed water level; and
   means for diverting water into one of the storing means based on a position of the controlling means.

2. The handsink of claim 1, wherein the circulating means comprises:
   means for routing water between the storing means and the dispensing means.

3. The handsink of claim 2, wherein the routing means comprises:
   means for pumping water from the storing means to the dispensing means.

4. The handsink of claim 2, wherein the circulating means is a closed loop.

5. The handsink of claim 2, wherein the controlling means comprises:
   means for restricting a flow of water through the routing means; and
   means for electronically controlling a status of the restricting means.

6. The handsink of claim 2, comprising:
   means for receiving dispensed water, wherein the routing means routes water from the receiving means to the storage means.

7. The handsink of claim 6, comprising:
   means for filtering water routed from the receiving means to the storage means.

8. A method for controlling a direction of water flow in a portable handsink including water storage tanks, a pumping system, a plumbing system, and a sink assembly, the method comprising:
   activating the pumping system to pump water out of the water storage tanks for dispensing water into the sink assembly;
   monitoring a water level in each water storage tank;
   controlling a flow of water from the sink assembly to each of the water storage tanks based on a respective water level of each tank by adjusting a position of a plurality of valves in the plumbing system; and
   adjusting the position of the plurality of valves to divert water flow through a diversion pipe of the plumbing system,
   wherein water is diverted through the diversion pipe when the water level in one of the water storage tanks is at a maximum fill level.

9. The method of claim 8, wherein activating the pumping system comprises:
   opening at least one of a hot water valve and a cold water valve.

10. A portable handsink, comprising:
    water storage tanks;
    a sink assembly;
    a pumping system that pumps water from the water storage tanks for dispensing into the sink assembly;

a control system for controlling a flow of water from the sink assembly to each of the water storage tanks based on a respective water level of each tank by adjusting a position of a plurality of valves in the plumbing system;

a filtration system that filters water flowing from the sink assembly to the water storage tanks; and a diversion pipe that diverts water into one of the water storage tanks based on a position of at least one of the plurality of valves.

11. The portable handsink of claim 10, comprising:

a plumbing system that interconnects the water storage tanks, the pumping system, the sink assembly, and the filtration system in a closed loop.

12. The portable handsink of claim 11, wherein the plumbing system includes a plurality of interconnected pipes and a plurality of valves strategically mounted in the plurality of pipes.

13. The portable handsink of claim 12, wherein each water storage tank includes a water level sensor.

14. The portable handsink of claim 13, further comprising:

a processor that receives water level data from the water level sensor and controls a direction of water flow from the sink assembly to the water storage tanks based on the water level data.

15. The portable handsink of claim 10, wherein the water storage tanks include a hot water tank and a cold water tank.

16. The portable handsink of claim 15, wherein the hot water tank includes a heating element.

* * * * *